United States Patent [19]

Asai

[11] Patent Number: 5,663,805

[45] Date of Patent: Sep. 2, 1997

[54] FACSIMILE DEVICE HAVING A MEMORY ALLOCATION SYSTEM AND METHOD FOR ALLOCATING MEMORY IN A FACSIMILE DEVICE

[75] Inventor: Kazunobu Asai, Nagoya, Japan

[73] Assignee: Brother Kogyo Kabushiki Kaisha, Nagoya, Japan

[21] Appl. No.: 420,558

[22] Filed: Apr. 12, 1995

[30] Foreign Application Priority Data

Apr. 28, 1994 [JP] Japan .................................. 6-113579

[51] Int. Cl.$^6$ ...................................................... H04N 1/21
[52] U.S. Cl. ............................................. 358/404; 358/444
[58] Field of Search ................................. 358/404, 434, 358/439, 442, 444, 468; H04N 1/21

[56] References Cited

U.S. PATENT DOCUMENTS 5,068,805  11/1991  Tsuzuki .
5,177,620  1/1993  Fukushima .......................... 358/404
5,359,429  10/1994  Takahasi ............................. 358/404
5,379,124  1/1995  Ikegaya et al. ..................... 358/444
5,428,460  6/1995  Kabeya et al. ..................... 358/404

FOREIGN PATENT DOCUMENTS 4-62169  2/1992  Japan .
4-152457  5/1992  Japan .

Primary Examiner—Kim Vu
Attorney, Agent, or Firm—Oliff & Berridge

[57] ABSTRACT

A facsimile unit has an image memory which can be used as a printing memory for storing received print image data for printing and as a communication memory for storing both part of the print image data and coded image data to be transmitted and/or coded image data of backup reception, instead of being used solely for image bitmap development for printing. The allocation proportion of the image memory between the printing memory portion and the communication memory portion can be arbitrarily set by the user depending on the usage. A memory device having a fixed capacity is then used efficiently and the cost of the facsimile unit is reduced.

11 Claims, 6 Drawing Sheets

| MEMORY | EXAMPLE 1 | EXAMPLE 2 | EXAMPLE 3 | EXAMPLE 4 |
|---|---|---|---|---|
| | UNUSED | UNUSED / 1-50% USED | UNUSED / 51-75% USED | 76-100% USED |
| PRINTING MEMORY SIZE | 100% | 50% | 25% | 0% |
| POSSIBLE PRINT RESOLUTION | STANDARD, FINE AND SUPER FINE | STANDARD AND FINE | STANDARD | PRINTING DISABLED |

| ITEM | INSTRUCTIONS |
|---|---|
| S1 | PRESS MODE CHANGE KEY |
| S2 | ENTER MEMORY SETTING MODE DISPLAY CURRENT MEMORY SETTING |
| S3 | PRESS MODE ADVANCE KEY TO SELECT INTENDED MEMORY MODE |
| S4 | PRESS ENTER KEY TO ESTABLISH INTENDED MODE |
| S5 | SETTING 1 ? |
| S6 | EXCLUSIVE PRINTING AREA ← 100%<br>COMMON AREA ← 0% |
| S7 | SETTING 2 ? |
| S8 | EXCLUSIVE PRINTING AREA ← 50%<br>COMMON AREA ← 50% |
| S9 | SETTING 3 ? |
| S10 | EXCLUSIVE PRINTING AREA ← 25%<br>COMMON AREA ← 75% |
| S11 | EXCLUSIVE PRINTING AREA ← 0%<br>COMMON AREA ← 100% |
| S12 | STORE SETTINGS IN EEPROM 8 |

Fig.5

FACSIMILE DEVICE HAVING A MEMORY ALLOCATION SYSTEM AND METHOD FOR ALLOCATING MEMORY IN A FACSIMILE DEVICE

BACKGROUND OF THE INVENTION

1. Field of the Invention

This invention relates to a facsimile device or apparatus which has an image memory for storing received image data and/or image data to be sent.

2. Description of the Related Art

Many conventional laser facsimile apparatus which print received images by means of a laser beam store the images on a page-by-page basis. These facsimile apparatus are generally equipped with an exclusive printing memory for storing a bitmap image of one page to be printed at the highest resolution. Some facsimile apparatus have a memory sending function for initially coding and temporarily storing image data in a memory and then later sending the image data at the specified time, and a backup receiving function for temporarily storing received coded image data in a memory when the apparatus is out of print paper. These facsimile apparatus are equipped with a communication memory separately from the printing memory.

In an image printing processor, an image is developed into a bitmap, with the resolution of the image data varied depending on the remaining memory capacity if the bitmap's size is greater than the usable area of the image printing memory, so that no part of image data is lost. Such an image printing processor is disclosed in U.S. Pat. No. 5,068,805 and Japanese Unexamined Patent Publication Nos. 4-62169 and 4-152457.

In the above-mentioned case of a facsimile apparatus having a printing memory and a communication memory, the printing memory needs a capacity sufficient to store the bitmap image data of one page at the highest resolution. This thus necessitates providing a large total memory capacity, and the facsimile apparatus is therefore expensive. Additionally, the printing memory is used exclusively for printing, and therefore is not used efficiently. For example, it is not possible for the communication function, when it needs additional memory area, to have an unused area of the printing memory allocated to the communication memory. In case the capacity of the communication memory is small, the memory sending function and backup receiving function are unfavorably limited in the quantity of transacted data.

SUMMARY OF THE INVENTION

This invention provides a facsimile apparatus in which an image memory is arbitrarily shared by or allocated between the printing and communication functions, so that it is efficiently used and the cost of the facsimile apparatus is reduced.

The facsimile apparatus has image memory means which includes both a printing memory portion for storing image data for printing and a communication memory portion for storing image data to be sent and/or received image data, printing means for printing image data read out of the image memory means, and memory area setting means for allocating the image memory means between the printing memory portion and the communication memory portion.

This facsimile apparatus has the image memory means, including both the printing memory portion for storing image data for printing and the communication memory portion for storing image data to be sent and/or received image data. The printing memory portion is not used solely to develop the bitmap image. Instead, its unused areas are also used as a portion of the communication memory portion for storing coded image data to be sent and/or for storing received coded image coded data. The allocation the image memory areas for printing and communication can be arbitrarily set. Thus, the image memory means can be efficiently used to meet each user application.

The facsimile apparatus of this invention has the image memory means which is used as a printing memory for received bitmap image data and also as a communication memory for storing coded image data to be sent and/or for storing received coded image data, with the printing and communication portions of the image memory means being arbitrarily allocated. Consequently, the image memory means, when not used as the printing memory, is used entirely for the communication memory. This enables a minimal available memory capacity to be effectively used. The facsimile apparatus does not need to have separate printing and communication memories, which is the case in the conventional facsimile apparatus. Therefore, the cost can be reduced.

BRIEF DESCRIPTION OF THE DRAWINGS

The preferred embodiments of this invention will be described in detail, with reference to the following figures, wherein.

DESCRIPTION OF THE PREFERRED EMBODIMENT

Figure 1:
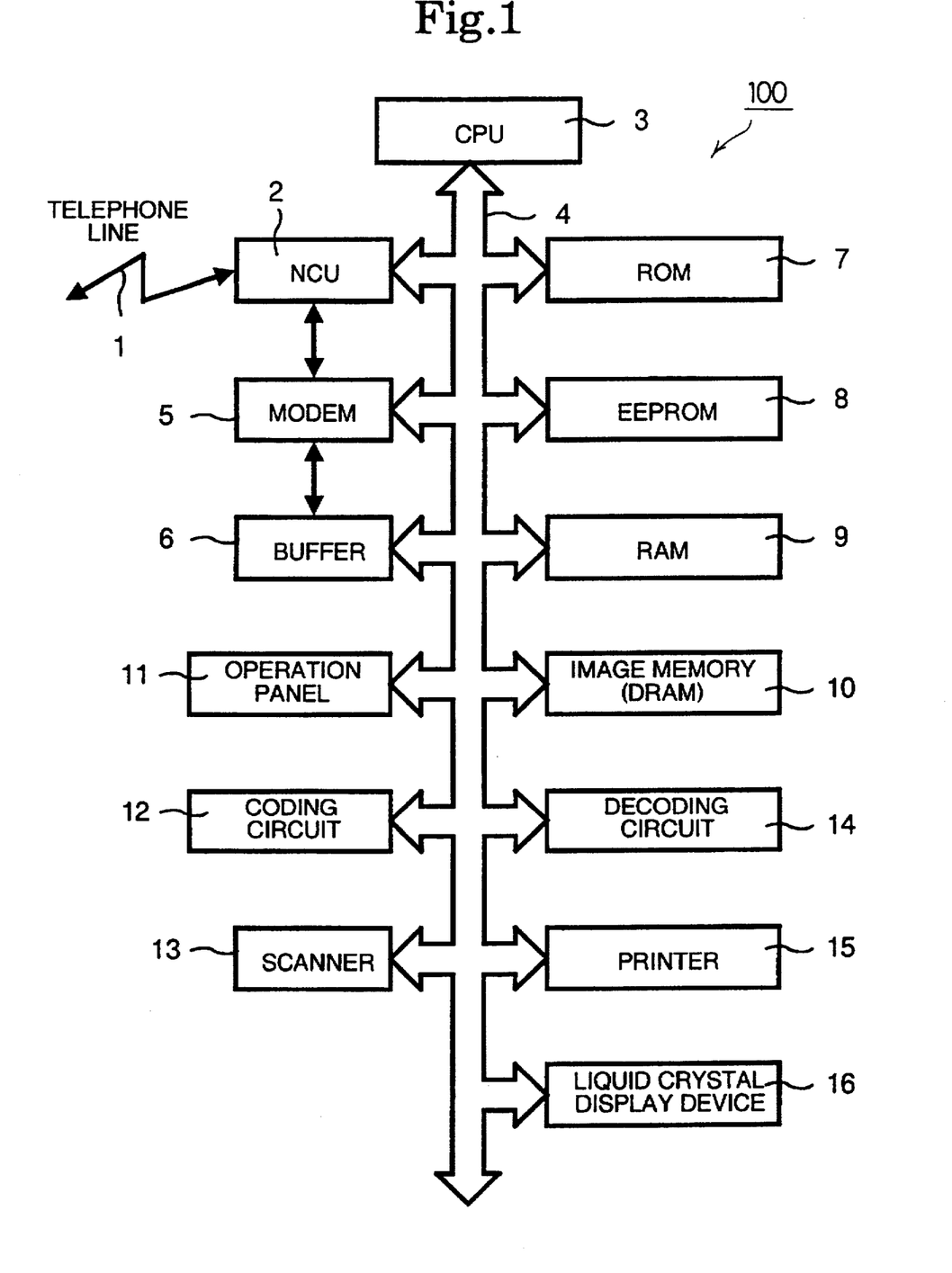
FIG. 1 is a block diagram of one preferred embodiment of the facsimile unit of this invention.

FIG. 1 is a block diagram of one preferred embodiment of the facsimile unit 100 of this invention. The facsimile unit 100 is connected to a telephone line 1 through a network control unit (NCU) 2. In the facsimile unit 100, a CPU 3 is the nexus for carrying out the facsimile data communication over the telephone line 1 in accordance with the prescribed communication control procedures and by controlling the internal circuits and devices connected to it through a signal bus 4.

Among the internal circuits and devices, a modem 5 is used to modulate and demodulate transacted image data and also to send and receive various procedural signals for transmission control. A buffer 6 temporarily stores data, including coded image data which is to be transmitted to, or has been transmitted from, an external facsimile unit (not shown) connected through the telephone line 1.

A ROM 7 store the control programs for the facsimile unit 100. An EEPROM 8 stores print settings. A RAM 9 temporarily stores data during operation of the facsimile unit 100. An image memory 10 stores image data and comprises a dynamic RAM (DRAM). The image memory 10 has a capacity large enough to store one full page of the bitmap image data when printed at the highest resolution. The image memory 10 is designed so that it can also be used as a communication memory for performing the backup receiving and memory sending operations.

The RAM 9 has special areas. One such special area is used for a page counter, which counts the page number of the received image data. Another such special area is used as a store counter, which counts the quantity of the image data stored in the memory 10. The count values are used to set the highest possible print resolution based on a size of the usable printing area available in the image memory 10.

An operation panel 11 includes an indicator for indicating the operational state of the facsimile unit 100. The operation panel 11 also includes a Mode Change key, a Mode Advance key and an Enter key (not shown), which are used by the operator set the memory area allocation between the printing memory portion and the communication memory portion. A liquid crystal display panel 16 is used to display the settings for the image memory 10.

A coding circuit 12 encodes image data to be sent, and a scanner 13 reads the original image to be sent. A decoding circuit 14 reads the received coded image data out of the communication memory portion of the image memory 10 and decodes the data. The image data is compressed based on run-length encoding for communication over the telephone line.

A printer 15 is used to print the received bitmap image data on a print paper by electrostatic electrophotography, for example, in which a latent image is formed on a photosensitive member by means of a laser beam. The image is then developed using toner. The toner image is then transferred to the print paper.

In a normal, real-time image receiving operation, after the facsimile unit 100 is connected, through the NCU 2 and the telephone line 1, to a sending facsimile unit (not shown), the control procedure signals are transmitted between the facsimile unit 100 and the sending facsimile unit under control of the CPU 3. Thus, the facsimile unit 100 receives coded image data from the sending facsimile. The received coded image data, in the coded (compressed) form, is decoded (expanded) by the decoding circuit 14. The decoded image data is converted into a page of bitmap image and stored into the printing memory portion of the image memory 10, so that the image is printed on a page-by-page basis. In developing the decoded image data into the bitmap image, a print resolution is selected depending on the amount of usable memory allocated to the printing memory portion of the image memory 10, so that no part of the current page of bitmap image is lost. The bitmap image is output to the printer 15, which prints the image onto a sheet of paper.

In the backup receiving operation, the received coded image data is stored in the communication memory portion of the image memory 10. Therefore, when printing, the stored coded image data is developed into the bitmap image page in the remaining area of the printing memory portion of the memory 10 by selecting a best available print resolution in the same manner as the normal, real-time receiving operation explained above.

In the usual image sending operation, the scanner 13 reads the image of the original text. The image data is encoded by the encoding circuit 12. The coded image data is transmitted, through the modem 5 and the NCU 2 over the telephone line 1, to an external receiving facsimile unit.

In the memory sending operation, the scanned and encoded image data is initially stored in the communication memory portion of the image memory 10. The sending operation takes place later at a time specified by the user. For the image relaying operation, in which the facsimile unit 100 receives image data and then resends the image data without printing, the image data is stored at the highest resolution regardless of the size of usable area of the image memory 10.

The image memory 10 is divided into arbitrary portions, as set by the user, comprising an exclusive printing area which forms part of the printing memory portion, and a common print/communication area usable as both a part of the printing memory portion and as the communication memory portion. The exclusive printing area is used solely to store the developed bitmap image to be printed. The common print/communication area is used both to store the coded image data for a memory sending operation or for a backup receiving operation, and also to store the bitmap image for printing, when the common print/communication area is not being used by the communication memory portion.

Figure 2:
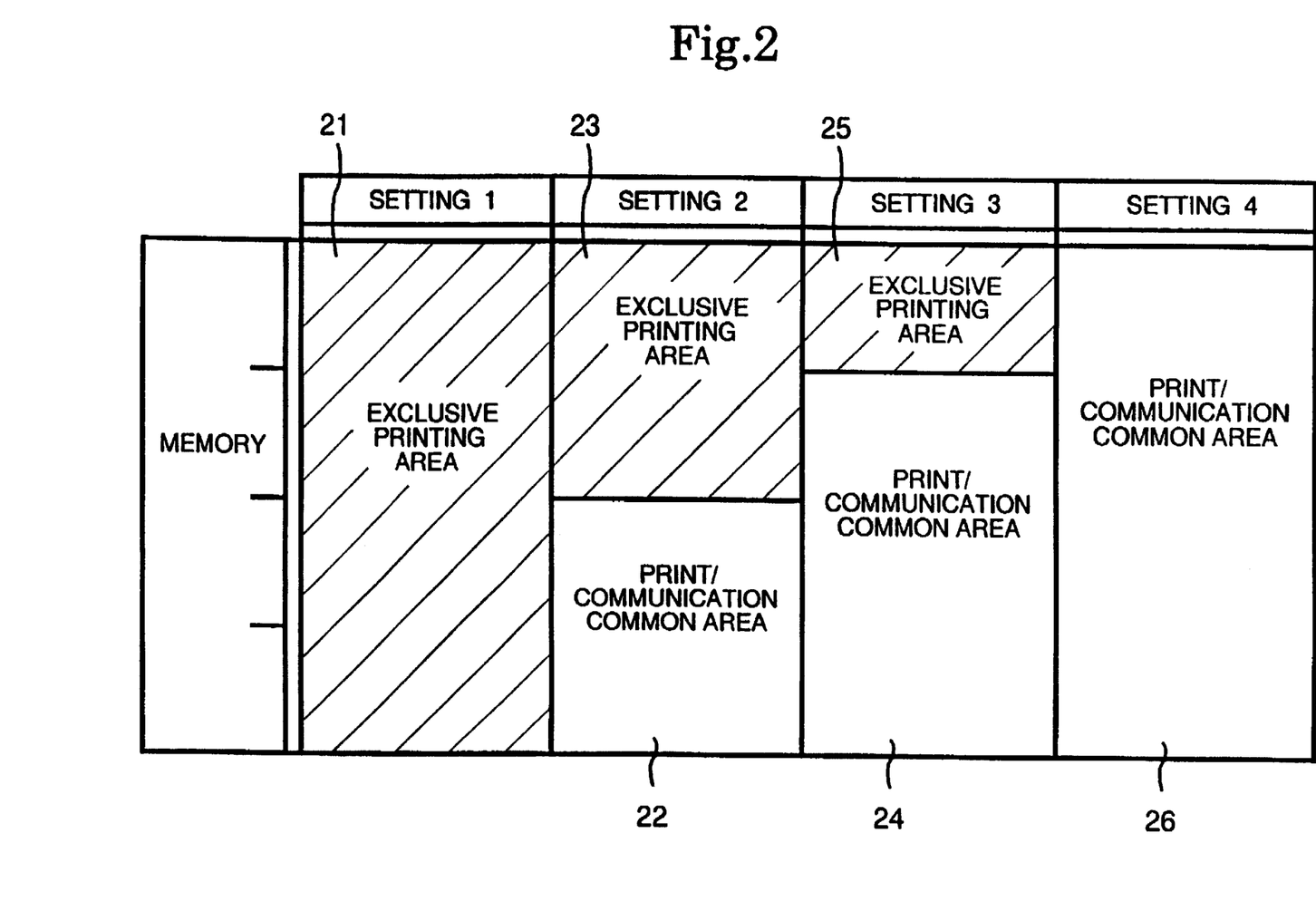
FIG. 2 shows examples of allocating the memory area for the facsimile unit of this invention.

FIG. 2 shows four examples of the division of the image memory 10 between the exclusive print area and the common print/communication area. Setting 1 allocates the entire memory area to an exclusive printing area 21. Settings 2 and 3 divide the memory area 10 into the exclusive printing areas 23 and 25 and the common print/communication areas 22 and 24, respectively. Setting 4 allocates the entire memory area to a common print/communication area 26.

The user can arbitrarily divide the memory 10 into the exclusive printing area and/or the common print/communication area depending on the operational mode of the facsimile unit 100. For example, the user should choose the setting 4 when the unit is used almost entirely in a communication mode. The user who intends to use the facsimile unit 100 frequently as a copy machine should choose setting 1 so that the entire image memory 10 is used as the printing area. These settings (settings 1-4) are stored in the EEPROM 8.

Based on the usage mode of the image memory 10, a possible printing memory size and a highest possible print resolution are determined from the usable memory area size.

Figure 3:
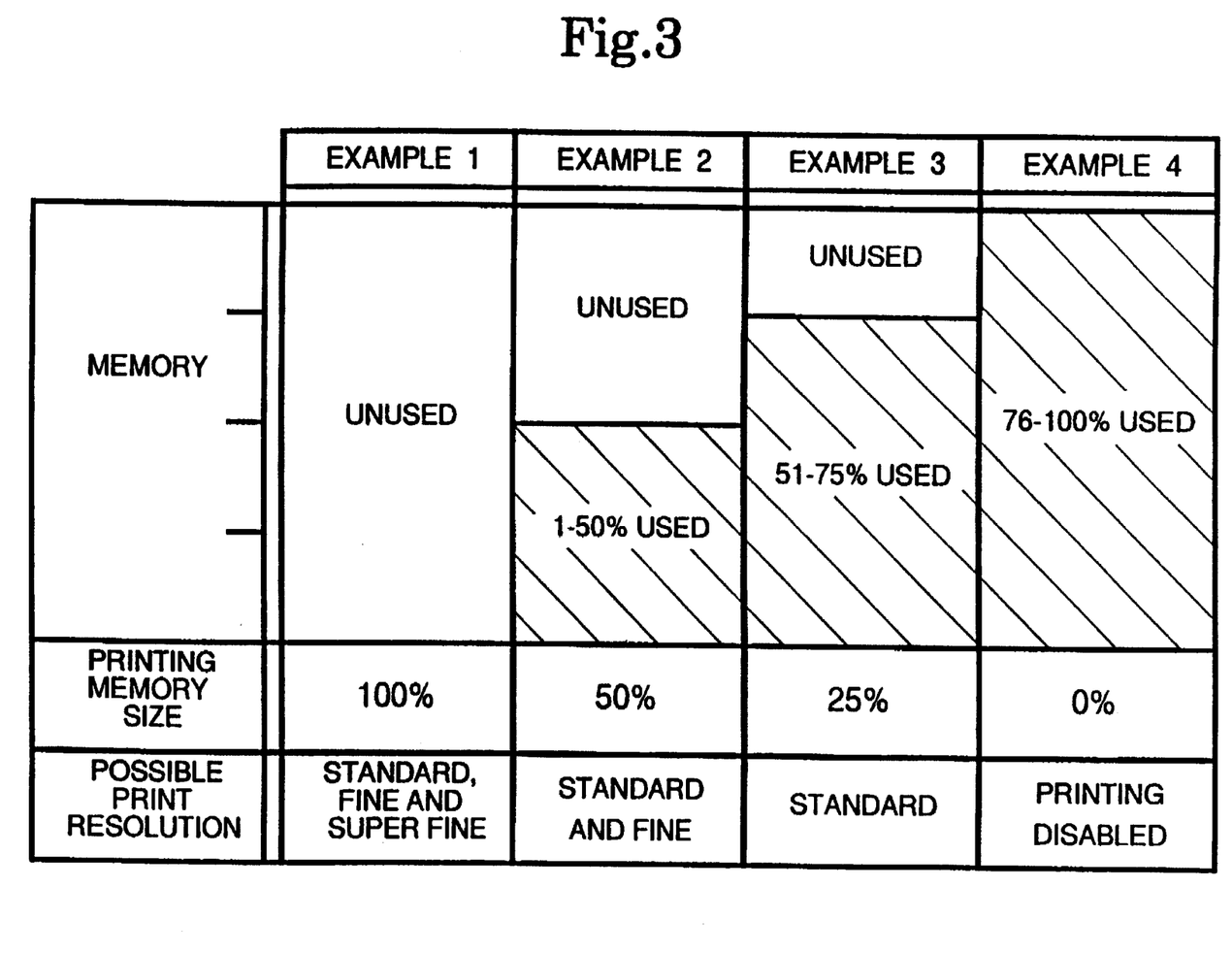
FIG. 3 illustrates the relationship between memory area usage and the print resolution of the facsimile unit of this invention.

FIG. 3 shows four examples of the relationship between the printing memory size, in percent, and the print resolution modes available based on the size of the occupied memory area of the image memory 10. Example 1 illustrates a situation where the entire image memory 10 is left unused by the communication memory portion, allowing a 100% printing memory portion to be allocated and any print resolution, among the standard, fine and super fine print resolution modes, to be used. Example 2 illustrates a situation where 1% to 50% of the memory area of the image memory 10 is already in use by the communication memory portion. This allows a 50%-99% printing memory portion to be allocated and only the available print resolutions of either standard or fine to be used. Example 3 illustrates a situation where 51%-75% of the memory area of the image memory 10 is already in use by the communication memory portion. This allows a 25%-49% printing memory portion to be allocated and only the available print resolution mode of standard to be used. Example 4 illustrates a situation where 76%-100% of the memory area of the image memory 10 is already in use by the communication memory portion. This allows for no printing memory portion to be allocated. Therefore, printing is disabled.

Figure 4A:
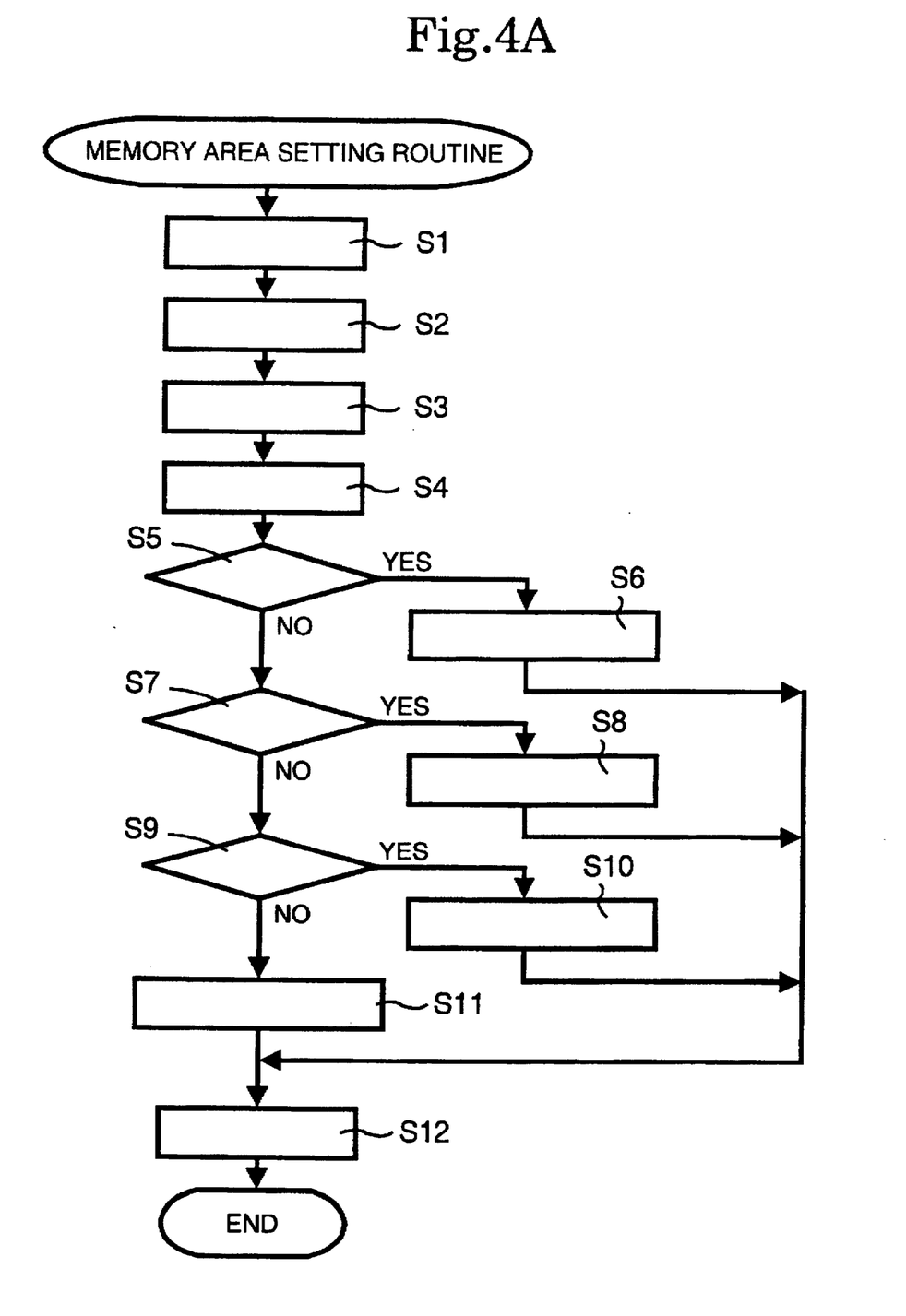
FIGS. 4A and 4B are a flowchart outlining the memory area setting operation.
Figure 4B:
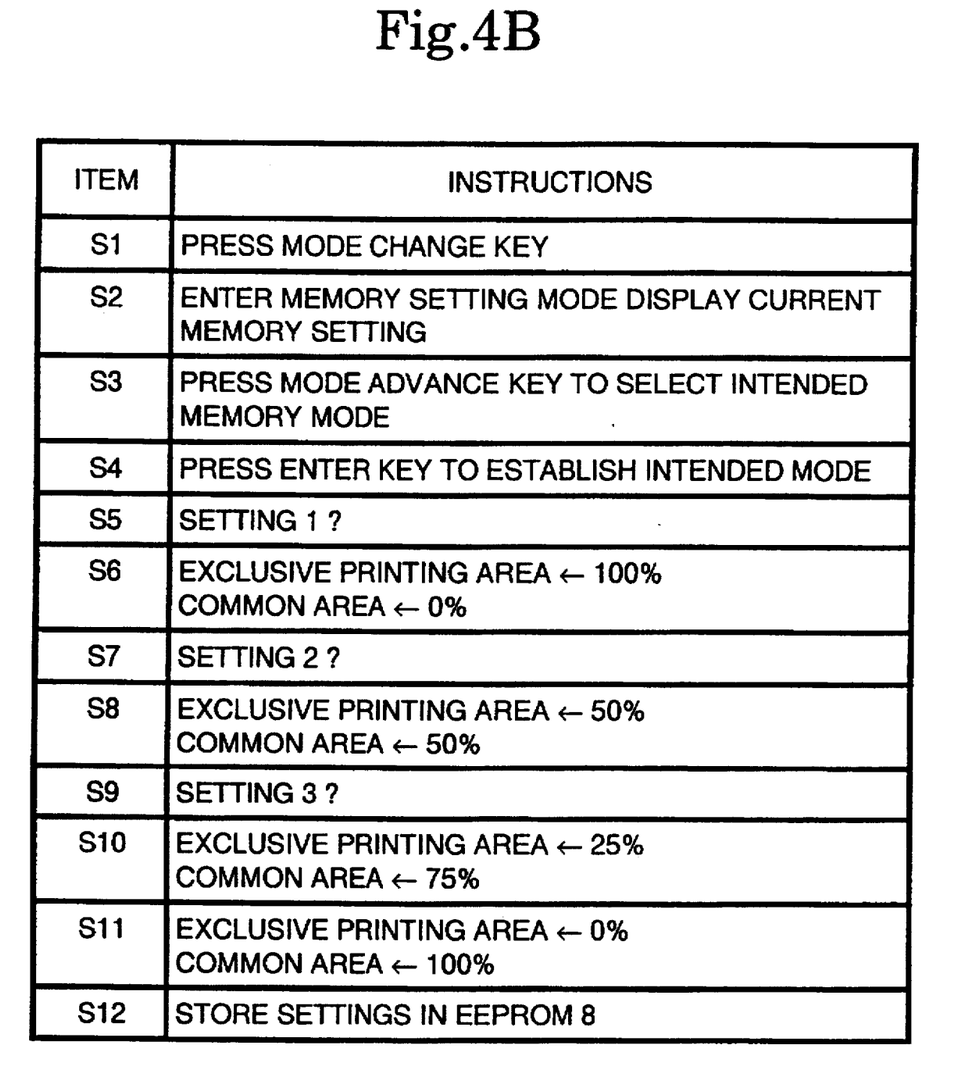

FIGS. 4A and 4B outline the memory area setting operation for the facsimile unit 100. Initially, in step S1, the user presses the Mode Change key on the operation panel 11. In step S2, the facsimile unit 100 enters the memory setting mode, and the setting (e.g., setting 1) which is currently effective is displayed on the liquid crystal display device 16.

Next, in step S3, the user operates the Mode Advance key to choose an intended mode, which is displayed on the display device 16. When, in step S4, the user presses the Enter key, the intended memory area settings are established.

Specifically, in step S5 when the Enter key is pressed and "setting 1" is the selected memory setting displayed on the display device 16 control continues step S6. In step S6, a 100% exclusive printing area and a 0% common print/communication area allocation is established. However, if in step S5, "setting 1" is not the selected memory setting, control jumps to step S7.

In step S7, if "setting 2" is the selected memory setting, control continues to step S8. In step S8, a 50% exclusive printing area and a 50% common print/communication area allocation is established. However, if in step S7, "setting 2" is not the selected memory setting, control jumps to step S9. In step S9, if "setting 3" is the selected memory setting, control continues to step S10. In step S10, a 25% exclusive printing area and a 75% common print/communication area allocation is established. However, if in step S9, the Enter key is pressed, with "setting 4" the selected memory setting displayed on the display device 16, control jumps to step S11. In step S11, a 0% exclusive printing area and a 100% common print/communication area allocation is established. Then, in step S12, the established settings are stored in the EEPROM 8.

Figure 5:
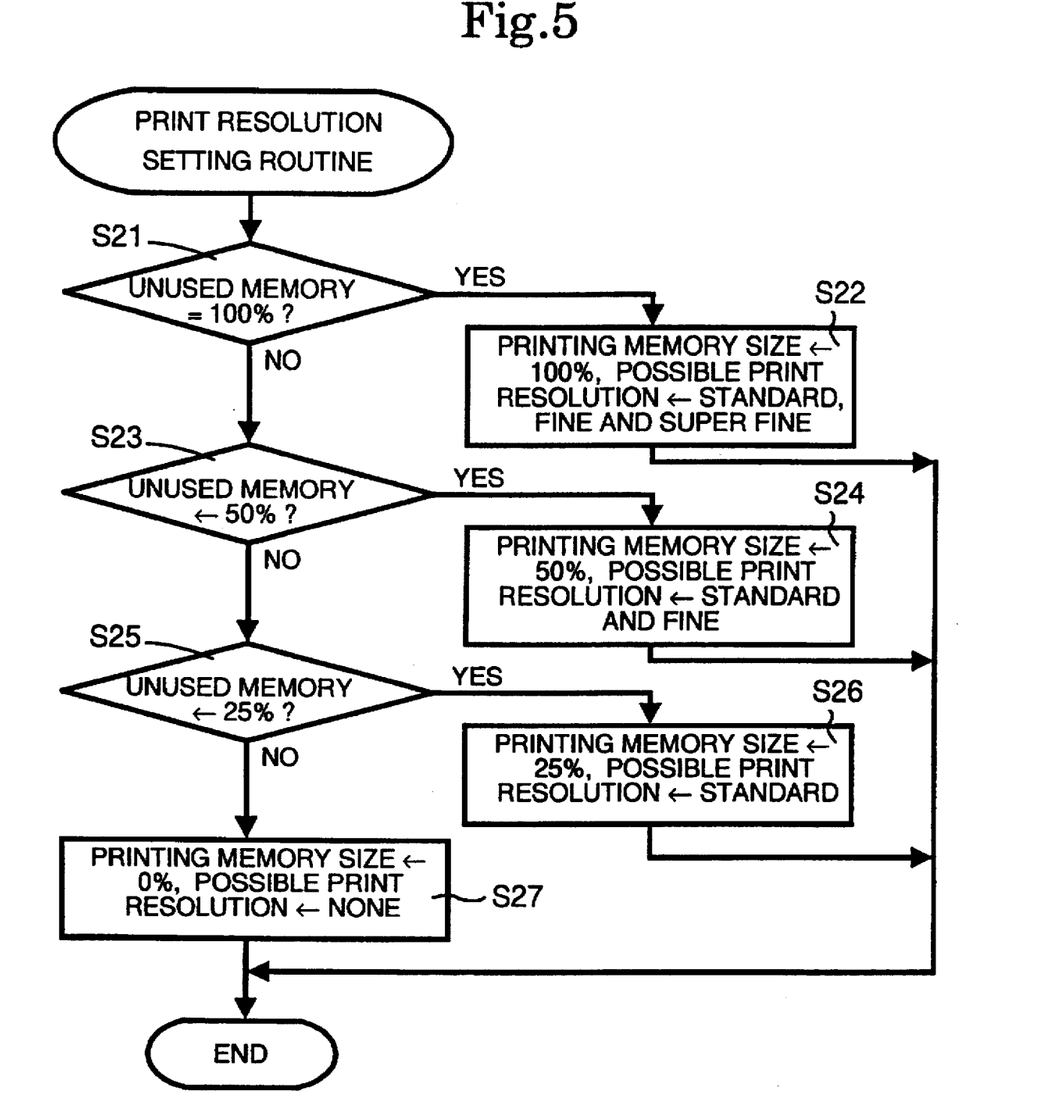
FIG. 5 is a flowchart outlining the print resolution setting process.

FIG. 5 outlines the process for setting a print resolution based on the memory usage shown in FIG. 3. This process limits the highest print resolution for image data based on the size of the unused memory area available in the image memory 10. This process is performed prior to printing, during developing the coded image data into the bitmap image page, which is stored in the printing memory portion of the image memory 10.

First, in step S21, the image memory 10 is tested to determine whether 100% of the memory area of the image memory 10 is available. If, in step S11, 100% of the memory area is available, control continues to step S22. In step S22, a 100% printing memory size is set and all print resolutions, including standard, fine and superfine, are enabled.

However, if in step S21, the unused area size is less than 100%, control jumps to step S23. In step S23, the image memory 10 is tested to determine whether 50% or more of the memory area of the image memory 10 is available. If so, control continues to step S24. In step S24, a 50% printing memory size is set and the print resolutions of standard and fine are enabled.

However, if in step S23, the unused area size is less than 50%, control jumps to step S25. In step S25, the image memory 10 is tested to determine whether 25% or more of the memory area of the image memory 10 is available. If so, control continues to step S26. In step S26, a 25% printing memory size is set and the print resolution of standard is enabled.

However, if in step S25, less than 25% of the memory area of the image memory 10 is available, control jumps to step S27. In step S27, a 0% printing memory size is set and all print resolutions are disabled. The enabled print resolutions are stored in the RAM 9.

By imposing a limit to the print resolution as outlined above, a full page of the bitmap image can be developed into the bitmap image data in the image memory 10 without running into a memory area shortage. Consequently, such faulty facsimile operations as a partial loss of image on the print result and the suspension of image printing due to the lack of memory area are prevented.

This invention is not confined to the foregoing preferred embodiment, but various modifications are possible. For example, it is possible to provide an exclusive printing area with a capacity just sufficient for developing one page of the bitmap image. Thus, the remaining memory area is used for the common print/communication area. Consequently, the minimum memory area necessary for printing one bitmap page is always available, the remaining memory area can be used for the communication function. As a result of the effective use of the memory having a limited capacity, the cost of the facsimile unit is reduced.

It is also possible to alter the exclusive printing area allocation on the fly, overriding the common print/communication area allocation, so that the maximum memory capacity is available for printing when necessary.

Although, in the preferred embodiment, the memory area setting is carried out by the user operating the operation panel 11, it may be implemented based on memory area setting data sent from an external sending facsimile unit. Alternately, the memory area allocation may be altered automatically based on the past trend of memory usage.

While the present invention has been described with reference to specific embodiments, it is not confined to the specific details set forth, but is intended to cover such modifications or changes as may come within the scope of the following claims.

What is claimed is:

1. A facsimile apparatus, comprising:
    image memory means including both a printing memory portion for storing only print image data for printing and a communication memory portion for storing both print image data and transmission image data to be transmitted and/or received;
    printing means for printing a print image in accordance with the print image data read out of said image memory means;
    memory area setting means for allocating said image memory means between the printing memory portion and the
    printing means for printing a print image in accordance with the print image data read out of said image memory means;
    memory area setting means for allocating said image memory means between the printing memory portion and the communication memory portion, said communication memory portion being determined as an area of said image memory means except for said printing memory portion; and
    print resolution setting means for setting a print resolution of the print image based upon a size of said printing memory portion and said communication memory portion except for an area being used for storing said transmission image data,
    wherein said image memory means has sufficient capacity to store at least one page of the print image data at the print resolution of the print image data and the print image is generated in accordance with the print resolution set by the print resolution setting means.

2. The facsimile apparatus of claim 1, wherein the memory area setting means comprises:
    mode selecting means for selecting one of a plurality of modes which vary a proportion of the printing memory portion and the communication memory portion allocated in said image memory means; and
    mode setting means for setting the allocation proportion of the printing memory portion and the communication memory portion based on the mode selected by said selecting means.

3. The facsimile apparatus of claim 1, further comprising unused area determining means for determining a size of an unused area in said image memory means for storing print image data for printing; and resolution determining means for determining a print resolution at which the print image data can be stored in the image memory means based on the size of the unused area determined by said unused area determining means.

4. A facsimile apparatus, comprising:

an image memory including both a printing memory portion storing only print image data to be printed and a communication memory portion storing both print image data and transmission image data to be transmitted and/or received;

a print device;

a memory area setting circuit allocating said image memory between the printing memory portion and the communication memory portion, said communication memory portion being determined as an area of said image memory except for said printing memory portion; and a print resolution setting circuit setting a print resolution of a print image based upon a size of said printing memory portion and said communication memory portion except for an area being used for storing said transmission image data, wherein said image memory has sufficient capacity to store at least one page of the print image data at the print resolution of the print image data, and the print image is generated in accordance with the print resolution set by the printing resolution setting circuit.

5. The facsimile apparatus of claim 4, wherein the memory area setting circuit comprises:

a mode selecting circuit selecting one of a plurality of modes, each mode allocating a different allocation proportion of the printing memory portion and the communication memory portion in said image memory; and a mode setting circuit setting the allocation proportion of the printing memory portion and the communication memory portion based on the mode selected by said mode selecting circuit.

6. The facsimile apparatus of claim 4, further comprising:

an unused area determining circuit determining a size of an unused area in said image memory device for storing print image data; and a resolution determining circuit determining a print resolution at which the print image data can be stored in the image memory based on the size of the unused area determined by said unused area determining circuit.

7. A facsimile device, comprising:

a scanner for inputting scanned image data;

a receiving system for inputting received transmission data from another facsimile device;

an encoding system for converting the scanned image data to transmission image data and converting the received transmission data to print image data;

a printer for printing the print image data onto a recording medium;

a memory for storing at least one of the transmission image data and the print image data; and a memory control system for allocating the memory between an exclusive printing area and a common printing/communication area, wherein only print image data is stored in the exclusive printing area and both print image data and transmission image data are stored in the common printing/communication area, the memory control system comprising:

a mode selection system for selecting one of a plurality of memory allocation modes, each memory allocation mode allocating different proportions of the memory between the exclusive printing area and the common printing/communication area; and a mode setting system for allocating the memory between the exclusive printing area and the common printing/communication area based on the selected memory allocation mode, wherein the printer prints at a plurality of resolutions, the memory has a storage capacity sufficient to store at least one page of print image data at a highest resolution of the printer and the resolution of the print image data is varied depending on a size of an unused memory portion of the memory.

8. The facsimile device of claim 7, wherein the memory control system comprises:

an unused capacity determining system for determining a size of an unused portion of the common printing/communication area; and a resolution determining system for determining a print resolution at which one full page of print image data can be stored in the exclusive printing area and the unused portion of the common printing/communication area based on the size of the unused portion of the common printing/communication area.

9. A method for allocating memory in a facsimile apparatus having an image memory, comprising:

defining a printing memory portion of the image memory for storing only print image data for printing;

defining a communication memory portion of the image memory for storing both print image data and transmission image data to be transmitted and/or received;

printing a print image in accordance with the print image data read out of said image memory;

allocating said image memory between the printing memory portion and the communication memory portion, said communication memory portion being determined as an area of said image memory except for said printing memory portion;

setting a print resolution of the print image based upon a size of said printing memory portion and said communication memory portion except for an area being used for storing said transmission image data; and generating the print image in accordance with the set print resolution.

10. The method of claim 9, further comprising:

determining a size of an unused area in said image memory for storing print image data; and determining a print resolution at which the print image data can be stored in the image memory means based on the determined size of the unused area.

11. The method of claim 9, wherein the step of allocating said image memory comprises:

selecting one of a plurality of modes which vary a proportion of the printing memory portion and the communication memory portion allocated in said image memory; and setting the allocation proportion of the printing memory portion and the communication memory portion based on the selected mode.

* * * * *